(12) United States Patent
Hannecart et al.

(10) Patent No.: US 10,245,766 B2
(45) Date of Patent: Apr. 2, 2019

(54) COMPOSITE CASING FOR AXIAL TURBOMACHINE LOW-PRESSURE COMPRESSOR

(71) Applicant: Techspace Aero S.A., Herstal (Milmort) (BE)

(72) Inventors: Benoit Hannecart, Herve (BE); Angela Durie, Knokke-Heist (BE)

(73) Assignee: Safran Aero Boosters SA (BE)

( * ) Notice: Subject to any disclaimer, the term of this patent is extended or adjusted under 35 U.S.C. 154(b) by 724 days.

(21) Appl. No.: 14/851,282

(22) Filed: Sep. 11, 2015

(65) Prior Publication Data
US 2016/0075063 A1   Mar. 17, 2016

(30) Foreign Application Priority Data

Sep. 12, 2014  (BE) .................................. 2014/0686

(51) Int. Cl.
*F01D 5/28* (2006.01)
*B29C 45/14* (2006.01)
(Continued)

(52) U.S. Cl.
CPC .. *B29C 45/14311* (2013.01); *B29C 45/14065* (2013.01); *B29C 70/462* (2013.01);
(Continued)

(58) Field of Classification Search
CPC . B29C 45/14065; B29C 70/462; B29C 70/48; B29C 45/0005; B29C 45/14786; B29C 70/30
See application file for complete search history.

(56) References Cited

U.S. PATENT DOCUMENTS

| | | | | |
|---|---|---|---|---|
| 4,956,411 A | * | 9/1990 | Tada | C07D 303/36 428/413 |
| 5,561,201 A | * | 10/1996 | Hattori | C08G 75/32 525/420 |
| 5,919,543 A | | 7/1999 | McCarville et al. | |

FOREIGN PATENT DOCUMENTS

| CN | 101054508 | * 10/2007 |
|---|---|---|
| EP | 1900502 A1 | 3/2008 |

(Continued)

OTHER PUBLICATIONS

European Search Report from corresponding Belgium Application No. BE 201400686, dated May 7, 2015.

*Primary Examiner* — Stella K Yi
(74) *Attorney, Agent, or Firm* — Sandberg Phoenix & von Gontard P.C.

(57) ABSTRACT

The invention relates to a method for manufacturing a composite casing for an axial turbomachine low-pressure compressor. The casing comprises a circular wall and a fixing flange which with the wall forms a sharp-edged corner. The method comprises the steps of: supplying a mold with a corner configured to form the edge corner of the casing; placing a filled thermoplastic resin profile section along the corner; placing a fibrous reinforcement in the mold to hug the profile section; closing the injection mold; polymerizing a resin injected into the mold and demolding the casing. The invention also relates to a composite casing with an annular wall and a flange at one end of the wall forming a sharp-edged corner on the inside of the casing. The casing is reinforced by a fibrous perform and the edge corner is reinforced with short fibers with a mean length of less than 5.00 mm.

9 Claims, 5 Drawing Sheets

(51) Int. Cl.
  *B29C 70/46* (2006.01)
  *B29C 70/48* (2006.01)
  *B29K 63/00* (2006.01)
  *B29L 31/00* (2006.01)
  *B29K 105/08* (2006.01)
  *B29K 307/04* (2006.01)

(52) U.S. Cl.
  CPC .............. *B29C 70/48* (2013.01); *F01D 5/282* (2013.01); *B29K 2063/00* (2013.01); *B29K 2105/08* (2013.01); *B29K 2307/04* (2013.01); *B29L 2031/711* (2013.01); *F05D 2230/21* (2013.01); *F05D 2300/43* (2013.01); *F05D 2300/44* (2013.01)

(56) References Cited

FOREIGN PATENT DOCUMENTS

| | | |
|---|---|---|
| EP | 2077183 A1 | 7/2009 |
| EP | 2610165 A1 | 7/2013 |
| JP | S6143541 A | 3/1986 |
| WO | 2013016482 A2 | 1/2013 |

\* cited by examiner

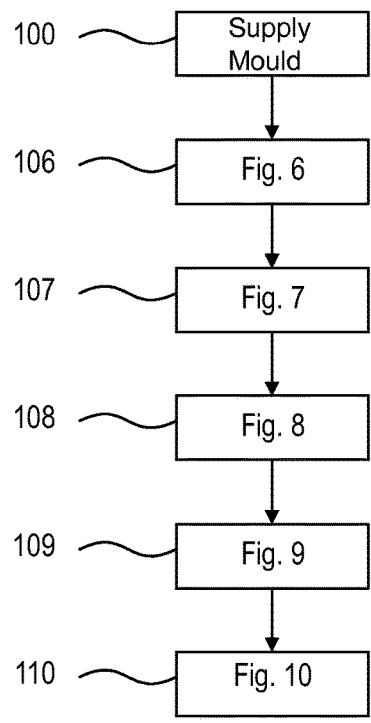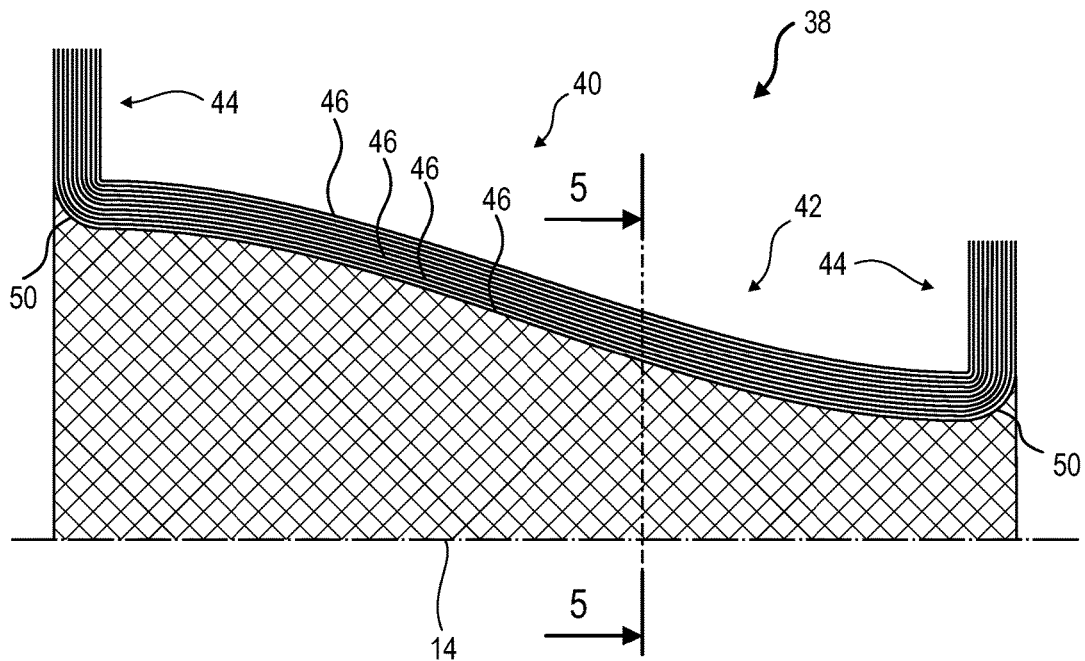

COMPOSITE CASING FOR AXIAL TURBOMACHINE LOW-PRESSURE COMPRESSOR

CROSS-REFERENCE TO RELATED APPLICATIONS

This application claims the benefit, under 35 U.S.C. § 119, of BE 2014/0686, filed Sep. 12, 2014, the disclosure of which is incorporated herein by reference in its entirety.

FIELD

The invention relates to a composite casing for a turbomachine. More specifically, the invention relates to a composite annular casing for an axial turbomachine having a circular wall, a radial annular flange and a sharp-edged corner where these meet. The composite comprises a fibrous reinforcement. The invention also relates to a method of manufacturing a turbomachine composite casing. The invention also relates to an axial turbomachine comprising a composite annular casing.

BACKGROUND

In order to lighten a turbomachine, some of the components thereof which are conventionally produced from metal may be made from a composite material. Structural elements such as the supports and casings may be made from a composite material. In particular, an external casing of a compressor, notably a low-pressure compressor, may be produced from a composite material.

Such a casing generally has a cylindrical wall supporting annular rows of blades, and annular fixing flanges extending radially. The flanges allow the compressor casing to be mounted on an intermediate fan casing and allow the fixing of a dividing annuler lip. The internal surface of the casing guides the annular flow along the compressor and for that reason needs to have a smooth surface, without steps. This constraint means that sharp-edged corners need to be produced at the fixing flanges.

A compressor composite external casing may be produced from a preform densified by a matrix. The preform may be formed by a stack of fibrous sheets stacked on top of one another, the sheets extending both over the cylindrical portion and onto the fixing flanges. Once shaped, the preform is placed in an injection mould that has edge corners to reproduce the desired shape of the casing. At the edge corner of the mould the stacked preform forms a fillet radius and leaves, in this region, a space that is unoccupied by fibers, or, at the very least, lacking in fibers. At the time of injection, the space is filled with resin without being reinforced by fibers. As a result, the composite casing exhibits a weakness at this point.

Document EP 1 900 502 A1 discloses a turbomachine composite annular casing. The casing has a tubular body and annular flanges at the ends of the body. The flanges form annular sharp-edged corners on the inside of the body. The composite casing comprises several fibrous reinforcements one of which is unraveled in the region of the edge corners so that the fibers there may be spread out in the joins between the flanges and the annular body. This unraveling is performed by means of a step of raising the temperature and allows the fibers to be spread out effectively in the edge corners. However, the unraveling step ties up the mould for a period of time that reduces the casing production rate. This teaching also entails the use of plies that are capable of being unraveled.

SUMMARY

It is an objective of the invention to solve at least one of the problems posed by the prior art. Another objective of the invention is to simplify the creation of a composite casing with a salient edge corner between a wall and a fixing flange. Another objective of the invention is to reinforce a turbomachine composite casing as close as possible to a sharp-edged corner under a flange. Another objective of the invention is to reduce the costs of a composite casing.

One object of the invention is a method of manufacturing a composite casing of a turbomachine, the casing comprising a wall that is generally circular or shaped as an arc of a circle, a fixing flange extending radially from one edge of the wall and forming with the wall a sharp-edged corner, wherein the method comprises the following steps, the order of which is exemplary and not limiting: (a) supplying or procuring a mould with a corner configured to form the edge corner of the casing; (b) supplying a filled thermoplastic resin profile section and placing same along the corner of the mould; (c) placing a fibrous reinforcement in the mould hugging the profile section, the fibrous reinforcement possibly being impregnated with a resin; (d) closing the mould; (e) polymerizing a resin injected into the mould or a resin with which the fibrous reinforcement is impregnated; (f) demoulding the casing.

According to various advantageous embodiments of the invention, during step (d) of closing the mould, the fibrous reinforcement is compressed against the profile section; the profile section possibly comprises a curved surface and the reinforcement is a fibrous preform configured to hug the curved surface of the profile section.

According to various advantageous embodiments of the invention, during the polymerization step (e), the injected resin or impregnated resin adheres to the profile section; for example the injected resin comes into contact with the profile section.

According to various advantageous embodiments of the invention, the resin of the profile section comprises an epoxy-type resin and/or polyamines.

According to various advantageous embodiments of the invention, the profile section comprises between 0.5 wt % and 5 wt % of fibers, notably carbon fibers.

According to various advantageous embodiments of the invention, the resin of the profile section comprises between 40 wt % and 90 wt % of N,N,N',N'-tetraglycidyl-4,4'-diaminodiphenylmethane.

According to various advantageous embodiments of the invention, the resin of the profile section comprises between 10 wt % and 30 wt % of polyether sulfone.

According to various advantageous embodiments of the invention, the resin of the profile section comprises between 1 wt % and 10 wt % of 1,5-Naphthalenediol; in various embodiments the resin of the profile section is a thixotropic resin.

According to various advantageous embodiments of the invention, the profile section has a triangular overall profile and a linear mass of between 5 and 20 kg/m, e.g., between 10 and 15 kg/m.

According to various advantageous embodiments of the invention, the length of the profile section is equal to the linear length of the associated edge corner.

According to various advantageous embodiments of the invention, the resin is a thixotropic resin.

According to various advantageous embodiments of the invention, the profile section comprises between 0.5 wt % and 10 wt % of aluminium powder.

According to various advantageous embodiments of the invention, the profile section comprises predominantly resin.

Another object of the invention is a composite casing for an axial turbomachine, notably for a compressor, the casing comprising: a wall that is generally circular or shaped as an arc of a circle; a fixing flange extending radially from one edge of the wall and forming with the wall a sharp-edged corner; a fibrous reinforcement reinforcing the wall and the flange; a matrix with an edge-corner zone between the edge corner and the fibrous reinforcement; notable in that the edge-corner zone comprises fibers the mean length of which is less than 10 mm.

According to various advantageous embodiments of the invention, the mean length of the fibers in the edge-corner zone is less than 4 mm, e.g., less than 2.00 mm.

According to various advantageous embodiments of the invention, in the edge-corner zone, the matrix contains aluminium powder possibly representing between 0.1% and 10% of the mass of the edge-corner zone.

According to various advantageous embodiments of the invention, the fibrous reinforcement comprises a profile exhibiting symmetry of revolution with a fillet radius which delimits the edge-corner zone; the fibrous reinforcement can comprise a stack of fibrous plies or the fibrous reinforcement is a fibrous preform produced by three-dimensional weaving.

According to various advantageous embodiments of the invention, the fixing flange is a circular or semicircular flange or an axial fixing flange.

According to various advantageous embodiments of the invention, the matrix occupies the fibrous reinforcement.

According to various advantageous embodiments of the invention, the mean length of the fibers of the fibrous reinforcement is greater than 30 cm, e.g., greater than 1 m.

According to various advantageous embodiments of the invention, the fibers of the reinforcement are arranged in layers.

According to various advantageous embodiments of the invention, in the edge-corner zone, the fibers are generally oriented randomly along the entire length of the edge corner.

Another subject of the invention is a turbomachine comprising a composite casing, notable in that the composite casing is produced according to a method for producing a composite casing according to the invention and/or the composite casing is in accordance with the invention.

The invention makes it possible to create a casing using a profile section the composition of which differs from that of the wall. The profile section makes it possible to create a sharp-edged corner the composition of which optimizes mechanical strength without lengthening the time taken to produce the casing or adding additional manufacturing steps. The choice of filler for the resin allows for the creation of a hybrid composite containing different types of fibers with different sizes and in variable proportion. Use of the profile section is simple; its thixotropic nature makes it easier to place in the corner of the mould.

The creation of an edge corner using a profile section made of resin intended to be polymerized makes it possible to form a matrix that has a composition devoted to the specific requirements of the edge corners. This improves the mechanical strength and endurance of the casing which can be subjected to vibrations, to chemical attack and to a temperature in excess of 170° C. while the turbomachine is in operation.

DRAWINGS

FIG. 3 is a diagram representing the method of manufacture of a casing according to various embodiments of the invention.

FIG. 4 schematically depicts a fibrous reinforcement of the casing according to various embodiments of the invention.

Figure 5:
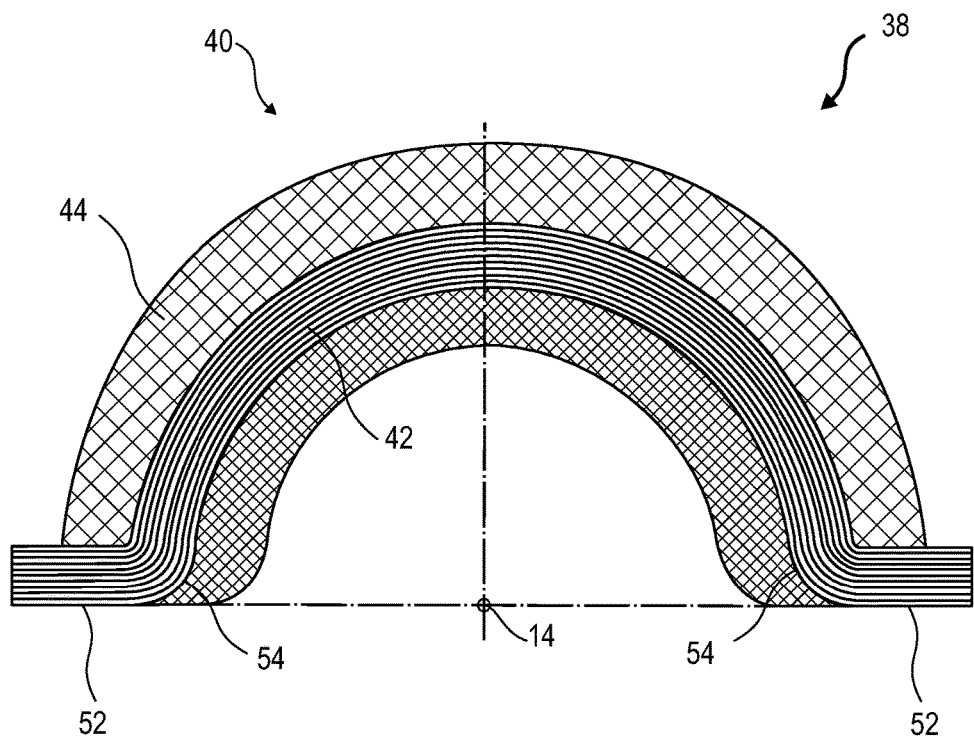

FIG. 5 illustrates a cross section through the fibrous reinforcement of the casing on the line 5-5 drawn in FIG. 4 according to various embodiments of the invention.

Figure 6:
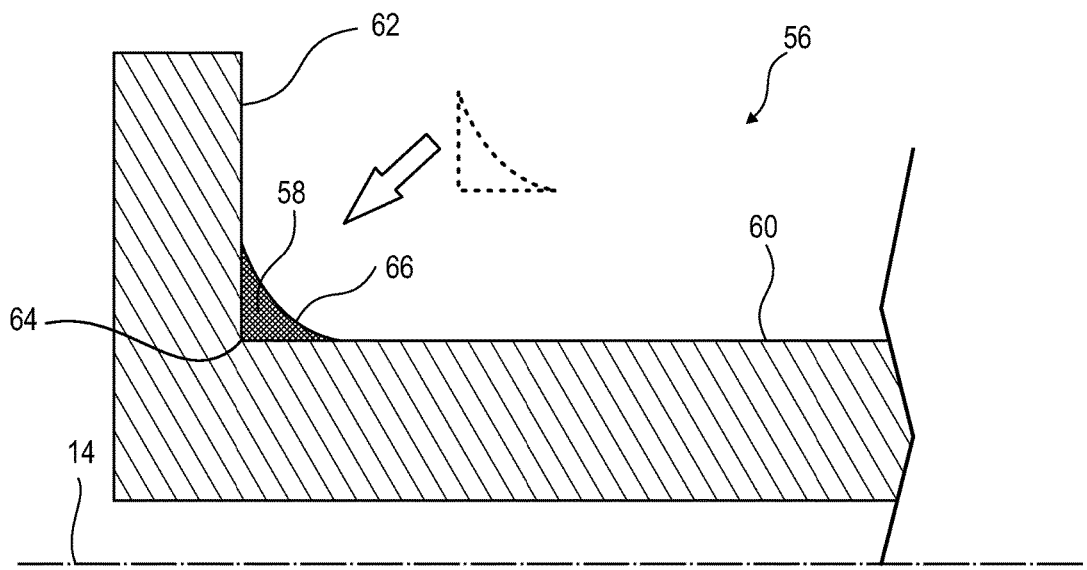

FIG. 6 depicts the step of the method whereby the profile section is placed in the mould according to various embodiments of the invention.

Figure 7:
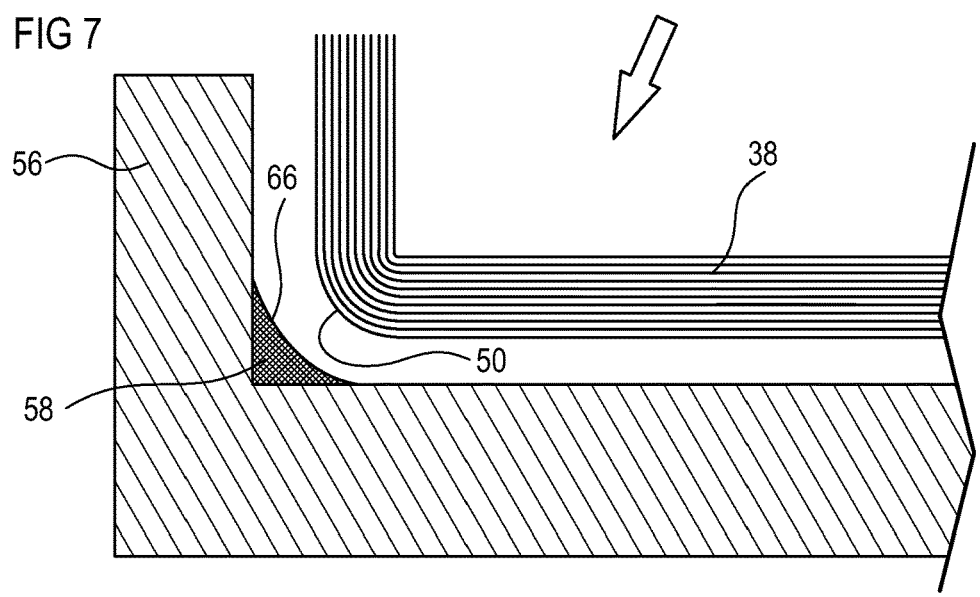

FIG. 7 depicts the step of the method whereby the fibrous reinforcement is placed in the mould according to various embodiments of the invention.

Figure 8:
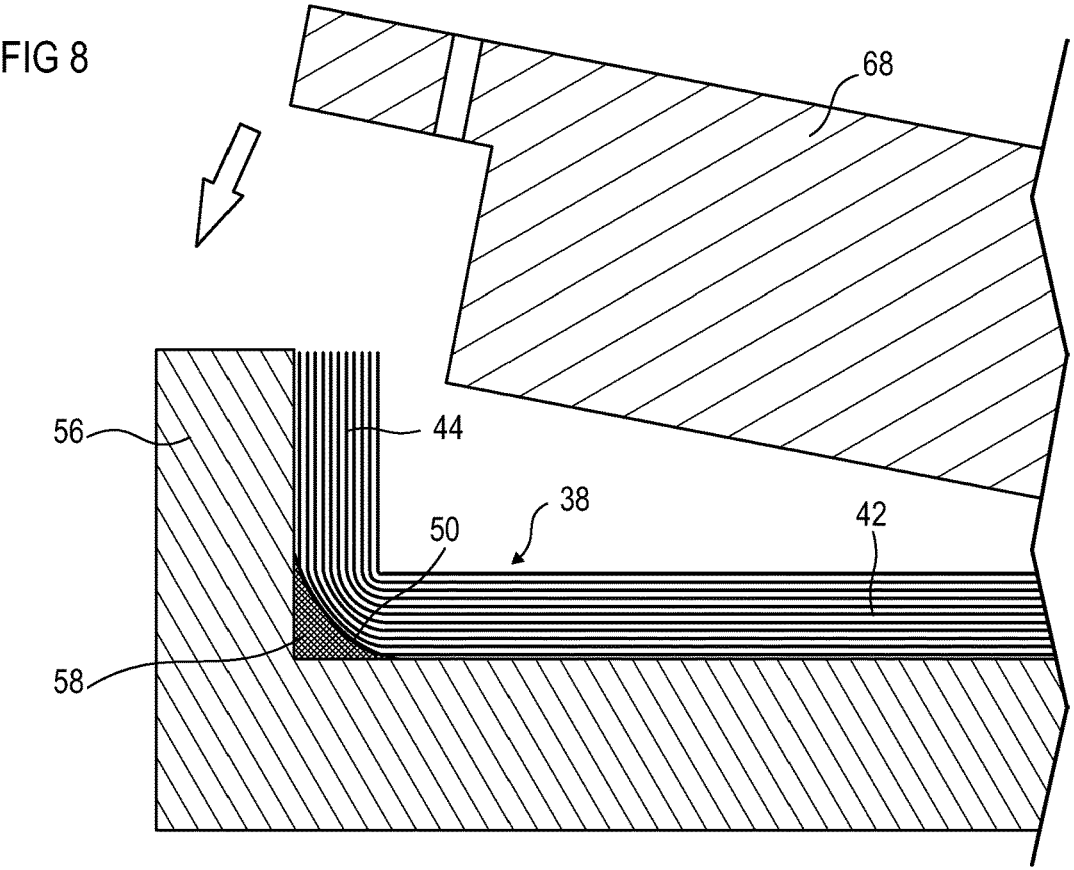

FIG. 8 depicts the step of the method whereby the mould is closed according to various embodiments of the invention.

Figure 9:
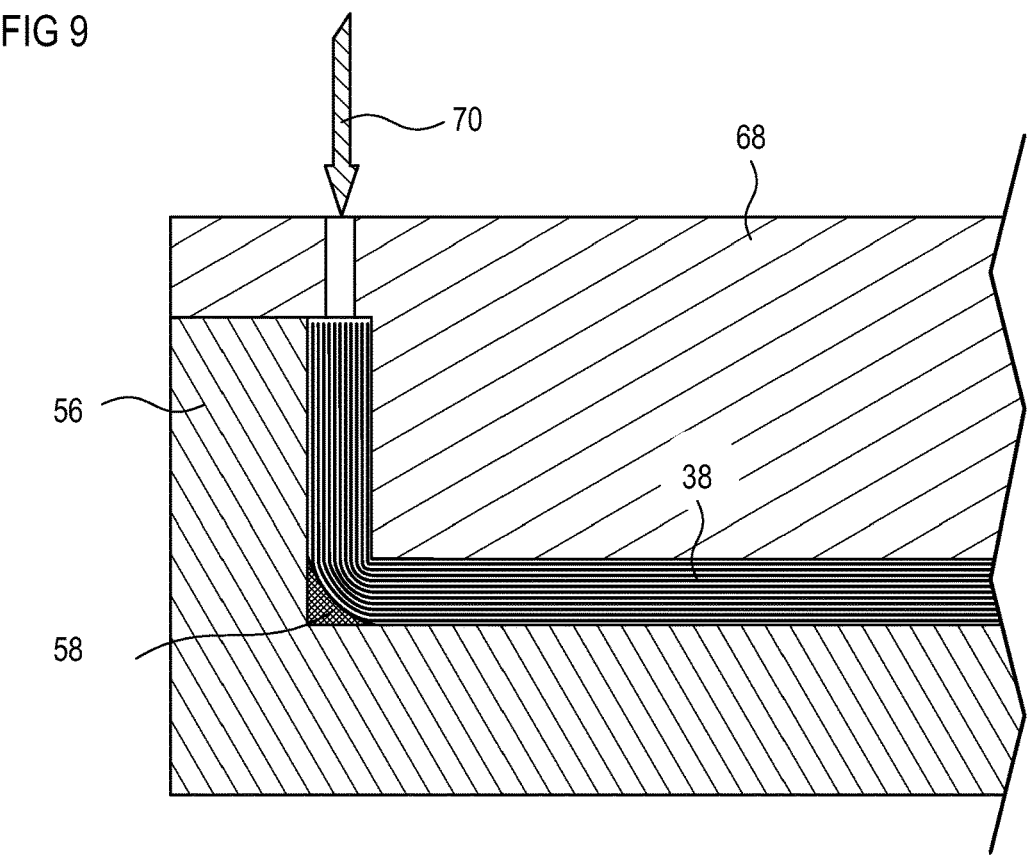

FIG. 9 depicts the step of the method whereby a resin is injected into and polymerized in the mould according to various embodiments of the invention.

Figure 10:
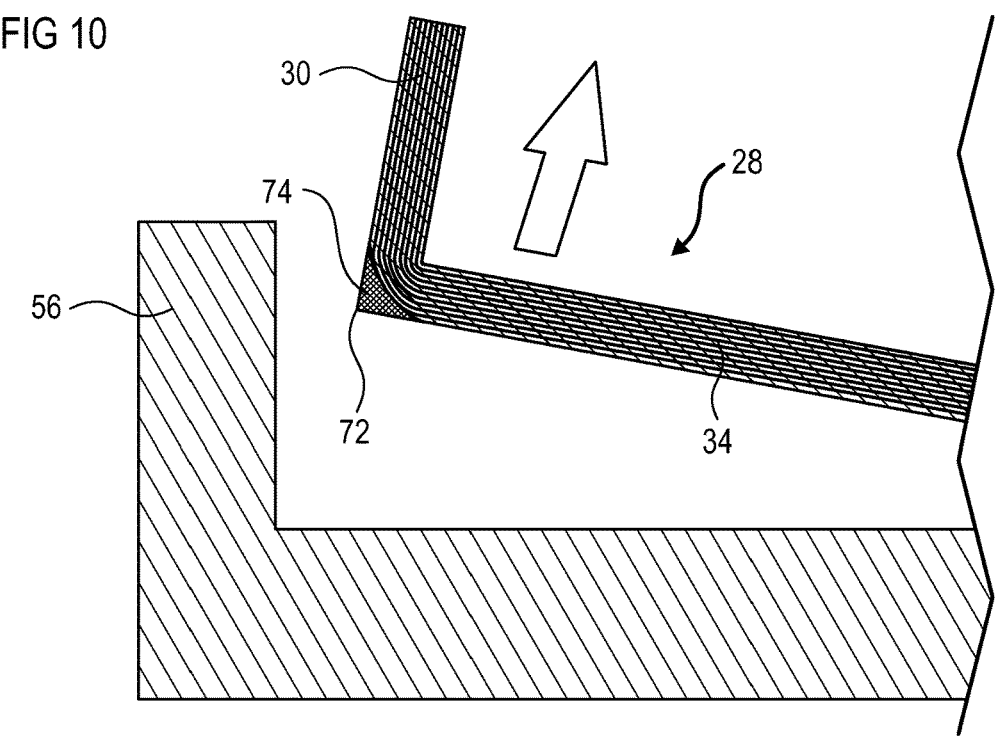

FIG. 10 depicts the step of the method whereby the casing according to various embodiments of the invention is demoulded.

DETAILED DESCRIPTION

In the description that follows the terms internal and external refer to a positioning with respect to the axis of rotation of an axial turbomachine.

Figure 1:
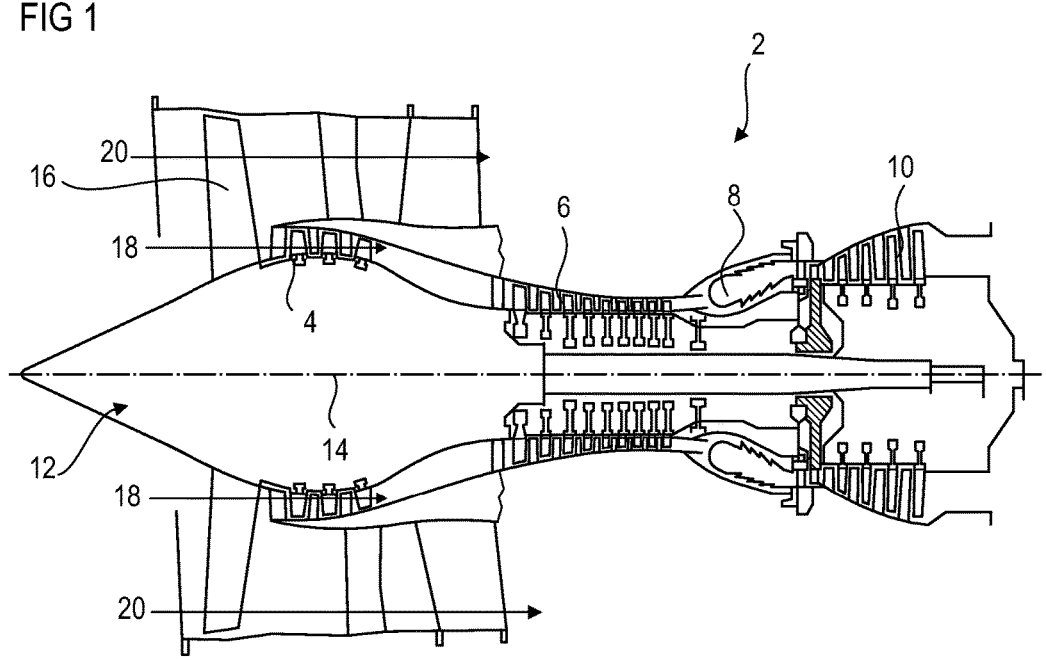
FIG. 1 depicts an axial turbomachine according to various embodiments of the invention.

FIG. 1 is a simplified depiction of an axial turbomachine. In this particular instance it is a bypass turbojet engine. The turbojet engine 2 comprises a first compression level, referred to as the low-pressure compressor 4, a second compression level, referred to as the high-pressure compressor 6, a combustion chamber 8 and one or more turbine levels 10. In operation, the mechanical power of the turbine 10 transmitted via the central shaft to the rotor 12 turns the two compressors 4 and 6. A step-down means can increase the rotational speed transmitted to the compressors. The compressors 4 and 6 comprise several rows of rotor blades associated with rows of stator blades. Rotation of the rotor 12 about its axis of rotation 14 thus makes it possible to generate a flow of air and compress this flow progressively until it enters the combustion chamber 8.

An inlet blower commonly referred to as a fan 16 is coupled to the rotor 12 and generates a flow of air which is divided into a primary flow 18 that passes through the various aforementioned levels of the turbomachine, and a secondary or bypass flow 20 that passes through an annular duct (depicted in part) along the machine to recombine with the primary flow later as it leaves the turbine. The primary flow 18 and the secondary flow 20 are annular flows and are ducted by the casings of the turbomachine.

Figure 2:
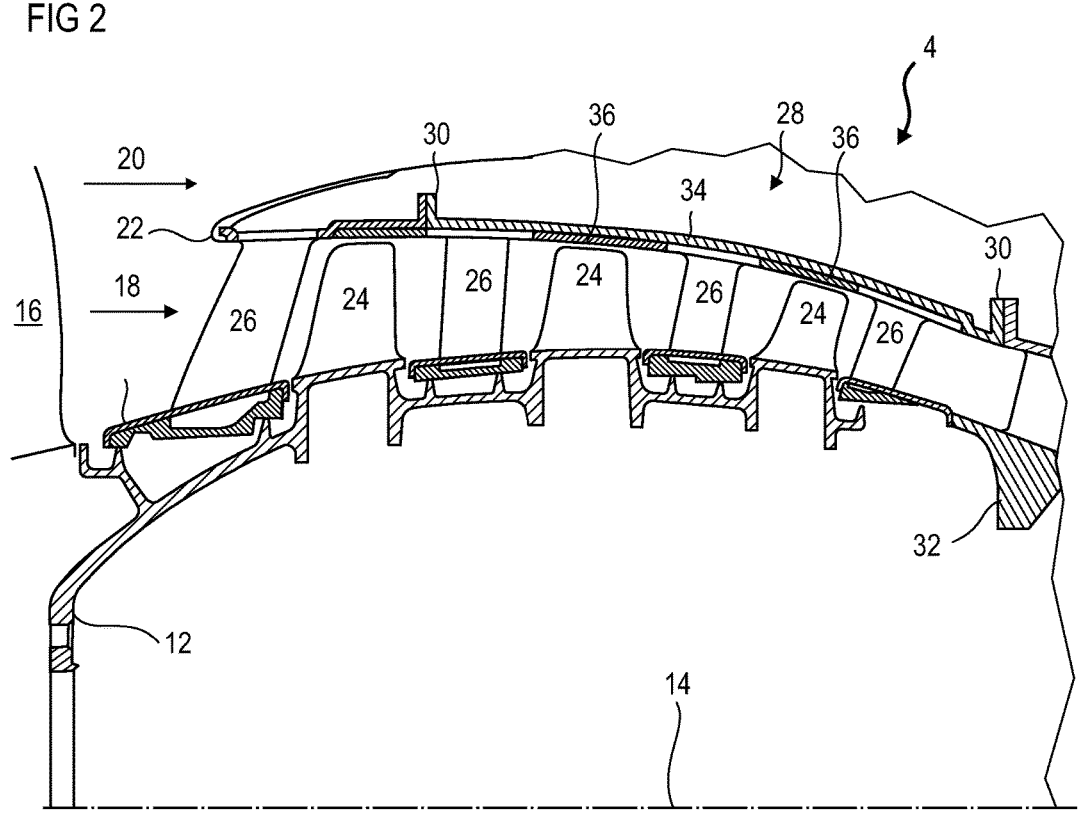
FIG. 2 is a diagram of a turbomachine compressor according to various embodiments of the invention.

FIG. 2 is a view in cross section of a compressor of a axial turbomachine 2 such as that of FIG. 1. The compressor can be a low-pressure compressor 4. Therein can be seen part of the fan 16 and the lip 22 that separates the primary flow 18 from the secondary flow 20. The rotor 12 comprises several rows of rotor blades 24, e.g., in this instance three rows.

The compressor comprises several sets of guide vanes, e.g., in this instance four sets, each containing a row of stator blades 26. The sets of guide vanes are each associated with a row of rotor blades 24 in order to straighten the flow of air, so as to convert the speed of the flow into pressure.

The compressor comprises at least one casing 28. The casing 28 can have an annular overall shape with a profile exhibiting symmetry of revolution about the axis of rotation 14 of the rotor 12. It can be an external casing and can be made of composite materials, for example with an organic matrix and a fibrous reinforcement. It can be essentially flat. The composite casing 28 can comprise fixing flanges 30, for example annular fixing flanges for fixing the dividing lip 22 and/or for fixing to an intermediate fan casing 32 of the turbomachine. The annular flanges 30 can comprise fixing holes (not depicted) to allow fixing using bolts or lock bolts.

The composite casing 28 can comprise a wall 34 generally circular or shaped as an arc of a circle, the edges of which can be delimited by the flanges 30. The wall 34 can be ogee shaped with a variation in radius along the axis 14. This change in radius can reverse. The wall 34 has an interior surface with double curvature.

The wall 34 can have annular surfaces for the fixing of blades and/or series of fixing holes (not depicted) arranged in annular rows for attaching the stator blades 26. The fixing holes can be fitted with inserts (not depicted) to reinforce the composite material of the annular casing 28. The inserts can be incorporated into the thickness of the wall 34 and/or of the flanges 30.

FIG. 3 is a diagram representing a method of manufacturing the composite annular casing 28, in accordance with various embodiments of the invention.

The method can comprise the succession of the following steps, the order of the steps provided below is exemplary only and should not be viewed as limiting:
  (a) supplying or procuring a mould with a moulding surface with a corner configured to form the edge corner of the casing, as indicated at 100;
  (b) supplying a thermoplastic resin profile section and placing the same along the corner of the mould as illustrated in FIG. 6, as indicated at 106;
  (c) placing a fibrous reinforcement in the mould hugging the profile section as illustrated in FIG. 7, as indicated at 107;
  (d) closing the mould as illustrated in FIG. 8, as indicated at 108;
  (e) polymerizing a resin possibly injected into the mould as illustrated in FIG. 9, as indicated at 109;
  (f) demoulding the casing as illustrated in FIG. 10, as indicated at 110.

During step (b) of supplying a profile section, indicated at 106, the resin thereof can be filled. It can comprise fibers or particles that improve its mechanical strength and/or give it a thixotropic nature.

According to various alternative embodiments of the invention, at the start of step (c) of supplying and placing a fibrous reinforcement, indicated at 107, the fibrous reinforcement can be impregnated with a resin beforehand. It can be formed of impregnated fibrous plies. During the polymerization step (e), indicated at 109, the resin with which the plies are impregnated is polymerized by heating the mould.

During step (c) of placing a fibrous reinforcement, indicated at 107, the reinforcement can be produced before it is placed in the mould. It can be shaped on a template, or woven. According to various alternative embodiments of the invention, the reinforcement can be shaped on the mould, for example by stacking in succession several fibrous plies on a moulding surface of the mould.

FIG. 4 depicts a cross section of the fibrous reinforcement of the casing 28, indicated be reference number 38, the cross section being taken along the axis of rotation 14. It being possible for the present teachings to be applied to any casing of the turbomachine.

The fibrous reinforcement 38 can exhibit symmetry of revolution with a profile exhibiting symmetry of revolution with respect to the axis 14. The profile can be flat. The fibrous reinforcement 38 can comprise a fibrous preform 40 which has been formed in such a way as to rough out the shape of the composite annular casing 28. The fibrous reinforcement 38 reinforces and occupies, in various embodiments completely, the wall and each flange of the casing.

The preform 40 can comprise a stack or a winding of various fibrous sheets 46 or fibrous plies 46, which can extend along the wall section 42, and along at least one or more fixing flanges 44. The preform 40 can comprise a layer with a fibrous mat, in various instances, made using three-dimensional weaving.

The plies 46 can comprise carbon fibers and/or graphite fibers and/or glass fibers. For example, the preform can comprise a central layer with plies made of carbon fiber, and at least one ply with glass fibers at the surface, for example, in order to avoid electrolytic corrosion. The fibers of the fibrous reinforcement can have a mean length greater than 30 cm, e.g., greater than 60 cm, e.g., greater than 100 cm. The plies 46 can be nonwoven plies or woven plies. On the inside, under each annular flange 44, the reinforcement, in various instances via its preform, forms an annular fillet radius 50 or elbow which results from the winding or successive application of plies to a pre-forming template.

FIG. 5 depicts a cross section of the fibrous reinforcement 38 of the composite casing, the cross section being taken along the line 5-5 drawn in FIG. 4.

The composite casing can describe a circle or can be an annular half-casing describing a semicircle, or an annular segment of an annular casing describing a fraction of a circle, such as a quarter, a sixth or an eighth of a circle. The annular casing can be divided along one or more planes extending along the axis of rotation 14. To join the half-casings or casing segments together, these are provided with axial fixing flanges intended to be fixed together.

As a result, the fibrous reinforcement 38 of the annular casing can also describe a semicircle and have axial flanges 52 extending radially. Because the fibrous reinforcement 38 can be created by successively stacking fibrous plies 46, axial fillet radii 54 or elbows can form at the edge of the wall, at the axial junction with the axial flanges, axially all the way along the axial flanges 52.

FIG. 6 depicts the step of supplying or procuring a mould 56 and the step of supplying and placing a profile section 58. A portion of mould 56 and the profile section 58 are depicted in cross section on a plane passing through an axis that corresponds to the axis 14.

The mould 56 can have moulding surfaces (60 and 62) generated by profiles exhibiting symmetry of revolution. The mould can have a generally tubular annular moulding surface 60 which is the counterpart to the interior surface of the annular casing. Although the profile of the tubular moulding surface 60 depicted here is straight, it is obvious that in practice it can become curved. The mould 56 can also have a moulding surface 62 extending radially, which is the counterpart of a fixing surface of a flange. The tubular surface 60 and the radial surface 62 form a corner 64 or re-entrant angle where they meet, making it possible to form the edge corner of the casing.

A profile section 58 made of resin is supplied and placed in the mould 56, so as to form the corner 64. Its length corresponds to that of the edge corner that is to be created. The profile section 58 can come in packaging to protect it from the ambient air. The resin of the profile section can be a thermoplastic resin such as an epoxy resin. The resin can comprise a filler, such as aluminium powder and/or fibers, in various instances, carbon fiber. The fibers can have a length of less 10 mm, e.g., less than 2 mm. Their mass represents between 0.1% and 20%, e.g., between 0.5% and 5% of the mass of the profile section.

The resin of the profile section 58 can comprise, by weight, between 40% and 90% of N,N,N',N'-tetraglycidyl-4,4'-diaminodiphenylmethane, and/or between 10% and 30% of polyether sulfone, and/or between 1% and 10% of 1,5-Naphthalenediol. The resin can possibly be a thixotropic resin, which means to say a resin the viscosity of which decreases under the action of mechanical stress.

The profile section 58 can have a cross section or a profile in its main direction of elongation that is generally triangular. One angle, in various instances, a right angle, of the profile of the profile section coincides with the corner of the mould 56 so as to fill it like a filler strip. The profile section 58 can also have a curved surface 66 so that it can collaborate with the elbowed profile of the fibrous reinforcement.

FIG. 7 depicts the step of placing a fibrous reinforcement in the mould. This figure corresponds to the creation of a circular edge corner associated with an annular flange. The present teachings can, in various instances, be transposed to an axial edge corner.

This step allows the fibrous reinforcement 38 to be placed against the moulding surface of the mould 56 and the profile section 58 to be covered. The reinforcement 38 hugs the entire radial height of the profile section 58, in various instances, over the entirety of the curved surface 66. The reinforcement 38 and/or the profile section 58 can be substantially deformed during this step because the fibrous reinforcement 38 is compressible. The profile section 58 can deform because of its elasticity and/or its thixotropic nature. The profile section 58 allows the volume between the edge corner and the elbowed portion of the fibrous reinforcement 38 to be filled.

FIG. 8 depicts the step of closing the mould 56 so as to enclose the profile section 58 and the reinforcement 38.

The mould is a mould portion 56 and comprises at least a second mould portion 68 or counter mould 68 which is applied against the fibrous reinforcement 38 and compacts the same. The counter mould 68 can reduce the thickness of the wall section 42 and/or the thickness of the flange 44 of the fibrous reinforcement 38. The effect of the closing of the mould can allow the thickness of the wall section 42 of the reinforcement to be reduced by at least 5%, e.g., at least 20%. The profile section 58 can also deform for the reasons explained earlier.

The reinforcement 38 and the profile section 58 can hug one another over the majority, e.g., over at least 80%, e.g., over the entirety of the thickness of the flange 44 and/or over the majority, e.g., over at least 80%, e.g., over the entirety of the thickness of the wall section 42 of the reinforcement 38. Where they hug, they compress one another, and the long side of the triangle becomes curved, and the fillet radius 50, where the flange 44 and the wall section 42 of the reinforcement meet, becomes compressed and flattened.

The presence of the counter mould 68 is optional because the composite casing can be moulded by closing the mould with a membrane.

FIG. 9 depicts the step of polymerizing the resin. This step can involve injecting a resin 70, e.g., an organic resin, into the injection mould (56 and 68). The injected resin 70 can be a thermoplastic resin such as epoxy, polyetherimide (PEI) or polyetheretherketone (PEEK). The injection can involve impregnating the reinforcement using a method of the RTM (Resin Transfer Moulding) type. The injected resin 70 spreads through the reinforcement 38 and comes into contact with the profile section 58.

The injected resin 70 and/or the resin of the profile section is/are configured in such a way as to allow adhesion between the profile section 58 and the reinforcement 38. The resins can be of the same nature or of the same type. They can both be epoxy resins.

Following these steps, the injected resin 70 adheres to the profile section 58, their resins harden and adhere to one another so as to form a solid body. Continuity of material; of resin; appears.

FIG. 10 depicts the step of demoulding the composite casing 28. First of all, the counter mould 68 is removed from the mould then a demoulding force is applied to the casing to extract it from the mould.

The as-moulded casing 28 can be machined. It can be perforated at the flanges 30 to create the fixing holes and/or at the wall 34 to allow the mounting of blades. The axial and/or annular flanges can potentially be trimmed to remove the heterogeneous ends which are provided especially in order to improve the quality of the finished flanges.

The casing 28 has a sharp-edged corner 72 forming a salient angle. This edge corner 72 can be incorporated into the turbomachine without the need for additional machining. The edge corner 72 can generally form a right angle, making it possible to create a smooth join when married up with a corresponding edge corner. The joining of two edge corners 72 makes it possible to create a flow-guiding surface that is free of steps that might detract from the good flowing of the flow. This connection can also form a smooth fixing zone, for example against which a blade platform can rest in order to position and secure it. The mean radius of the wall 34 can be greater than 1%, e.g., greater than 2%, e.g., greater than 4% and in some instances, greater than 6% of the radius of the edge corner 72.

The composite casing 28 is a hybrid casing. It has a wall and a flange reinforced with the long fibers of the preform. It also has an edge-corner zone 74 that also has a matrix and a filler. This filler can contain aluminium powder and/or the fibers provided in the profile section. The material of the edge-corner zone 74 corresponds to that of the profile section.

What is claimed is:

1. A method for manufacturing a composite casing of a turbomachine, the casing comprising an arcuate wall, a fixing flange extending radially from one edge of the wall and forming with the wall a sharp-edged corner, said method comprising:

supplying a mould with a corner configured to form an edge corner of the casing;

supplying a filled thermoplastic resin profile section and placing the filled thermoplastic resin profile section along the corner of the mould, the profile section being of triangular shape;

placing a fibrous reinforcement in the mould hugging the profile section;

closing the mould;

injecting a resin into the mould such that the resin comes into contact with the profile section and polymerizing said resin in the mould, wherein during the polymerization, the resin adheres to the profile section; and demoulding the casing.

2. The method in accordance with claim 1, wherein during the closing of the mould, the fibrous reinforcement is pressed against the profile section.

3. The method in accordance with claim 1, wherein the resin of the profile section comprises an epoxy-type resin.

4. The method in accordance with claim 1, wherein the profile section comprises between 0.5 wt % and 5 wt % of carbon fibers, the carbon fibers being in contact with the resin and with the fibrous reinforcement.

5. The method in accordance with claim 1, wherein the resin of the profile section comprises between 40 wt % and 90 wt % of N,N,N',N'-tetraglycidyl-4,4'-diaminodiphenylmethane.

6. The method in accordance with claim 1, wherein the resin of the profile section comprises between 10 wt % and 30 wt % of polyether sulfone.

7. The method in accordance with claim 1, wherein the resin of the profile section comprises between 1 wt % and 10 wt % of 1,5-Naphthalenediol.

8. The method in accordance with claim 1, wherein the resin of the profile section is a thixotropic resin.

9. The method in accordance with claim 1, wherein the profile section has a linear mass of between 5 and 20 kg/m.

* * * * *